United States Patent
Kimura et al.

(10) Patent No.: US 8,982,930 B2
(45) Date of Patent: Mar. 17, 2015

(54) COMMUNICATION APPARATUS, COMMUNICATION METHOD, COMPUTER PROGRAM, AND COMMUNICATION SYSTEM

(75) Inventors: Ryota Kimura, Tokyo (JP); Kazuyuki Sakoda, Tokyo (JP); Yuichi Morioka, Tokyo (JP)

(73) Assignee: Sony Corporation, Tokyo (JP)

(*) Notice: Subject to any disclaimer, the term of this patent is extended or adjusted under 35 U.S.C. 154(b) by 219 days.

(21) Appl. No.: 13/318,470

(22) PCT Filed: Apr. 19, 2010

(86) PCT No.: PCT/JP2010/056918
§ 371 (c)(1),
(2), (4) Date: Nov. 1, 2011

(87) PCT Pub. No.: WO2010/128620
PCT Pub. Date: Nov. 11, 2010

(65) Prior Publication Data
US 2012/0057622 A1    Mar. 8, 2012

(30) Foreign Application Priority Data
May 8, 2009 (PA) .............................. P2009-113867

(51) Int. Cl.
*H04B 1/38* (2006.01)
*H04L 5/16* (2006.01)
*H04B 7/04* (2006.01)
*H04W 72/04* (2009.01)

(52) U.S. Cl.
CPC ........... *H04B 7/0452* (2013.01); *H04W 72/046* (2013.01)

USPC .................................. 375/219; 370/276; 710/1

(58) Field of Classification Search
USPC ............................................................ 375/219
See application file for complete search history.

(56) References Cited

U.S. PATENT DOCUMENTS

| | | | | |
|---|---|---|---|---|
| 4,993,026 | A * | 2/1991 | Yamashita ..................... | 370/540 |
| 5,668,811 | A * | 9/1997 | Worsley et al. ................ | 370/424 |
| 6,470,057 | B1 * | 10/2002 | Hui et al. ....................... | 375/294 |
| 2004/0258012 | A1 | 12/2004 | Ishii | |
| 2005/0099955 | A1 * | 5/2005 | Mohan et al. .................. | 370/242 |
| 2008/0199183 | A1 * | 8/2008 | Liu et al. ........................ | 398/103 |
| 2008/0259904 | A1 * | 10/2008 | Wang et al. .................... | 370/350 |
| 2009/0122711 | A1 * | 5/2009 | Soomro et al. ................ | 370/252 |
| 2010/0229053 | A1 * | 9/2010 | Kushnick ....................... | 714/704 |

(Continued)

FOREIGN PATENT DOCUMENTS

| | | |
|---|---|---|
| CN | 1575017 | 2/2005 |
| EP | 1480483 | 11/2004 |

(Continued)

*Primary Examiner* — Erin File
(74) *Attorney, Agent, or Firm* — Sony Corporation

(57) ABSTRACT

Appropriate communication operation is performed by employing space division multiple access in which wireless resources on a space axis are shared by a plurality of users. Frame exchange is performed between an access point and terminals whereby the access point estimates delay times of the terminals and notifies the terminals of information on the delay times and the terminals perform uplink frame transmission to the access point taking a difference among the delay times into consideration. Interference among users may be reduced in the access point and throughput of a system which performs the space division multiple access is improved.

17 Claims, 9 Drawing Sheets

(56) References Cited

U.S. PATENT DOCUMENTS

2010/0286805 A1* 11/2010 Gao et al. .................. 700/94
2010/0303100 A1* 12/2010 Niamut et al. ............. 370/503
2011/0064034 A1* 3/2011 Zhu ............................ 370/329

FOREIGN PATENT DOCUMENTS

| JP | 2001-16159 | 1/2001 |
| JP | 2004-350088 | 12/2004 |
| JP | 2007-184687 | 7/2007 |

* cited by examiner

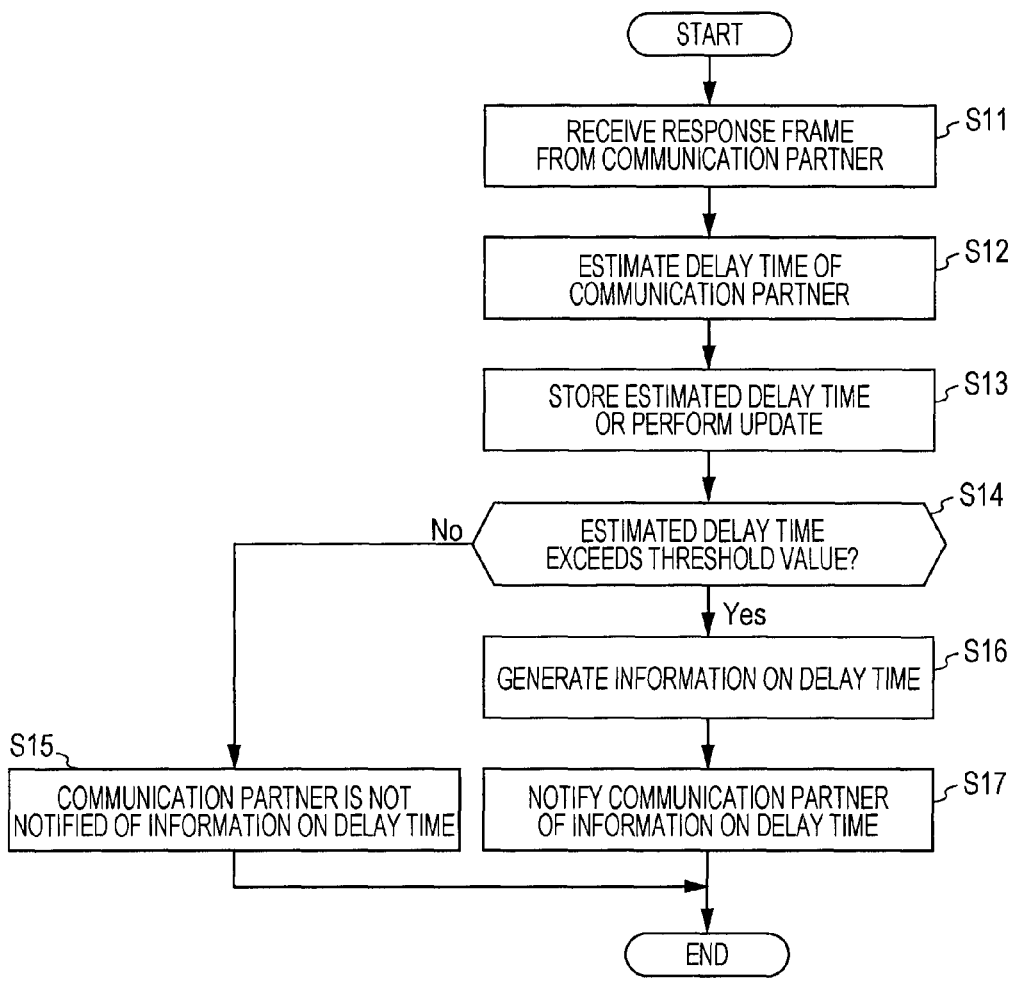

COMMUNICATION APPARATUS, COMMUNICATION METHOD, COMPUTER PROGRAM, AND COMMUNICATION SYSTEM

TECHNICAL FIELD

The present invention relates to communication apparatuses, communication methods, computer programs, and communication systems which employ SDMA (Space Division Multiple Access) in which wireless resources on a space axis are shared by a plurality of users. The present invention particularly relates to a communication apparatus, a communication method, a computer program, and a communication system which employ the SDMA in an environment in which communication is performed on the basis of CSMA (Carrier Sense Multiple Access).

BACKGROUND ART

Wireless communication is used as a technique of avoiding loads of wiring works in conventional wired communication and realizing mobile communication. For example, examples of a general standard of a wireless LAN (Local Area Network) include the IEEE (The Institute of Electrical and Electronics Engineers) 802.11. The IEEE802.111/g has been broadly used.

In many wireless LAN systems including the IEEE802.11, an access control procedure based on carrier sense such as CSMA/CA (Carrier Sense Multiple Access with Collision Avoidance) or the like is employed so that communication stations avoid collision of carriers at a time of random channel access. Specifically, a communication station which corresponds to generation of a transmission request monitors a medium state only for a predetermined frame interval DIFS (Distributed Inter Frame Space). When a transmission signal is not detected in the predetermined frame interval DIFS, random back-off is performed. Furthermore, when a transmission signal is not further detected while the random back-off is performed, the communication station obtains an exclusive-channel use/transmission right (TXOP: Transmission Opportunity) of an exclusive channel and is allowed to transmit a frame. Furthermore, examples of a methodology for addressing hidden terminal problem in a wireless communication include "virtual carrier sense". Specifically, the communication station assumes, when information on a duration (sustained period) for reservation of a medium is written in a reception frame to be received by another communication state, that the medium has been used in a period of time corresponding to the duration information, that is, performs carrier sense and sets a transmission stop period (NAV: Network Allocation Vector). By this, exclusive use of a channel in the TXOP is ensured.

The IEEE802.11a/g standard supports a modulation method which attains a communication speed of 54 Mbps at maximum (in a physical layer data rate) and which utilizes orthogonal frequency division multiplexing (OFDM) in a frequency band of 2.4 GHz or a frequency band of 5 GHz. Furthermore, a further high bit rate is realized in the IEEE802.11n standard which is an expansion standard of the IEEE802.11a/g standard by employing an MIMO (multi-Input Multi-Output) communication method. Here, in the MIMO communication method, a transmitter and a receiver have a plurality of antenna elements and a spatial multiplexing stream is realized (which is a known method). Although high throughput (HT) of 100 Mbps or more is attained by the IEEE802.11n standard, there is a demand for further speeding-up since an amount of information on transmission content is increased.

For example, by increasing the number of streams subjected to spatial multiplexing along with the increased number of antennas of an MIMO communication apparatus, throughput in one-to-one communication may be improved while backward compatibility is maintained. However, in the future, in addition to a throughput for each user in communication, throughputs for all users should be improved.

An IEEE802.11ac working group aims plot of a wireless LAN standard of a data transmission speed of 1 Gbps or more using a frequency band equal to or smaller than 6 GHz. To attain this plot, a space division multiple access method, such as multiuser MIMO (MU-MIMO) or SDMA (Space Division Multiple Access), in which wireless resources on a space axis is shared by a plurality of users becomes a possible candidate.

At present, the space division multiple access is discussed as one of fundamental technologies of a next-generation cellular phone system based on TDMA (Time Division Multiple Access) such as PHS (Personal Handyphone System and LTE (Long Term Evolution).

Furthermore, a communication system obtained by combining two techniques, that is, carrier sense based on the conventional IEEE802.11 standard and space division multiple access using an adaptive array antenna with each other using an RTS packet, a CTS packet, and an ACK packet which have packet formats which maintain backward compatibility with the conventional IEEE802.11 standard has been proposed (refer to Patent Literature 1, for example).

However, in a wireless LAN field, although one-to-many communication described above has been attracting attention, such communication has been rarely applied. This may be because it is difficult to efficiently multiplex a plurality of users in packet communication.

Particularly, under an infrastructure mode in which a plurality of terminals (MT) are associated with a single access point (AP) and are connected to a network as members of a BSS (Basic Service Set), when the terminals simultaneously perform uplink (UL) access to the access point, a difference of delay times among the terminals causes a problem. This delay time difference is mainly caused by transmission delays of the terminals associated with relative positions of the terminals relative to the access point and errors unique to the terminals such as clock accuracy. For example, in a specification of the IEEE802.11, an error of ±900 nanoseconds is tolerated as accuracy of a frame interval of transmission/reception. The delay time differences among the terminals which are larger than a Guard interval length used in OFDM cause interference among users when the terminals simultaneously transmit frames to the access point. Therefore, an effect of improvement of throughput caused by the space division multiple access is not expected.

To address the problem of the delay time differences among the terminals, a wireless transmission/reception system in which an access point employs a technique of removing interference and an equalization technique has been proposed (refer to Patent Literature 2, for example). However, implement of this technique in communication equipment causes increase of circuit cost which is an adverse effect when the access point is to be designed and fabricated at low cost.

Furthermore, as another method for addressing the problem of the delay time differences among the terminals, control of transmission times of the terminals is taken as an example. Although the delay time differences among the terminals may be controlled in a wireless LAN system in which TDD (Time Division Duplex) frames are clearly divided into an uplink and a downlink and in a communication system based on a reserved TDMA (Time Division Multiple Access) in which a base station takes initiative and a slot is ensured (refer to Patent Literatures 2 and 3, for example), the correction of the delay time differences is not applicable to a wireless LAN system based on the CSMA.

CITATION LIST

Patent Literature

PTL 1: Japanese Unexamined Patent Application Publication No. 2004-328570
PTL 2: PCT Japanese Translation Patent Publication No. 2006-504335
PTL 3: Japanese Patent No. 42023555

DISCLOSURE OF INVENTION

Technical Problem

An object of the present invention is to provide an excellent communication apparatus, an excellent communication method, an excellent computer program, and an excellent communication system which are capable of suitably performing a communication operation using space division multiple access in which wireless resources on a space axis are shared by a plurality of users.

Another object of the present invention is to provide an excellent communication apparatus, an excellent communication method, an excellent computer program, and an excellent communication system which are capable of suitably performing an communication operation using the space division multiple access under an environment of communication operated on the basis of the CSMA.

A further object of the present invention is to provide excellent communication apparatuses which operate as terminals associated with an access point and each of which is capable of suitably transmitting a frame of an uplink to the access point while avoiding interference among users of the other terminals, an excellent communication method, an excellent computer program, and an excellent communication system.

Solution to Problem

This application has been made in view of the problem described above, and according to the invention set forth in claim 1, there is provided a communication apparatus including
a data processor which processes a transmission/reception frame, and
a communication unit which transmits/receives the frame,
wherein the data processor estimates a delay time of a communication partner in accordance with a required period of time from when a reference frame serving as a reference of delay time estimation is transmitted to the communication partner to when a response frame supplied from the communication partner is received.

According to the invention set forth in claim 2 of this application, the data processor according to claim 1 may estimate, in a case where the communication partner starts transmission of the response frame without back-off when a given frame interval has been elapsed after the reception of the reference frame is completed, the delay time of the communication partner taking the required period of time and the frame interval into consideration.

According to the invention set forth in claim 3 of this application, the data processor of the communication apparatus according to claim 1 may estimate, in a case where the communication partner starts transmission of the response frame including information on an arbitrary waiting time when the waiting time has been elapsed after the reception of the reference frame is completed, the delay time of the communication partner taking the required period of time and the waiting time obtained from the response frame into consideration.

According to the invention set forth in claim 4 of this application, the communication unit of the communication apparatus according to claim 1 may include a plurality of antenna elements functioning as an adaptive array antenna, multiplex and transmit the plurality of frames on the same time, and receive a plurality of frames transmitted from a plurality of communication partners on the same time.

According to the invention set forth in claim 5 of this application, the communication unit of the communication apparatus according to claim 4 may transmit the reference frame to the communication partners, and the data processor may estimate delay times of the communication partners in accordance with required periods of times until the response frames returns from the communication partners such that at least portions of the reference frames overlap with one another on a time axis.

According to the invention set forth in claim 6 of this application, the data processor of the communication apparatus according to claim 1 may store information on the estimated delay time or update information on an estimated delay time which has been stored.

According to the invention set forth in claim 7 of this application, the data processor of the communication apparatus according to claim 1 may determine information on the estimated delay time and generate a notification frame including the information on the delay time, and the communication unit may transmit the notification frame to the communication partner.

According to the invention set forth in claim 8 of this application, the data processor of the communication apparatus according to claim 7 may determine the information on the delay time in accordance with a result of a comparison between the estimated delay time and a predetermined threshold value.

According to the invention set forth in claim 9 of this application, the communication unit of the communication apparatus according to claim 7 may transmit the reference frame to the plurality of communication partners, the data processor may determine information on the delay times of the communication partners and generate a notification frame, and the communication unit may transmit the notification frame to the communication partners on the same time.

According to the invention set forth in claim 10 of this application, there is provided a communication apparatus including
a data processor which processes a transmission/reception frame, and
a communication unit which transmits/receives the frame,
wherein the data processor extracts information on a delay time of the data processor from a notification frame transmitted from a communication partner, and
the communication unit controls a transmission timing in accordance with the information on the delay time and transmits a frame to the communication partner.

According to the invention set forth in claim 11 of this application, there is provided a communication method including a step of transmitting a reference frame serving as a reference of delay time estimation to a communication partner, a step of estimating a delay time of the communication partner in accordance with a required period of time until a response frame transmitted from the communication partner is received, a step of determining information on the estimated delay time and generating a notification frame including the information on the delay time, and a step of transmitting the notification frame to the communication partner.

According to the invention set forth in claim 12 of this application, there is provided a communication method including a step of receiving a notification frame transmitted from a communication partner, a step of extracting information on a delay time of own apparatus from the notification frame, and a step of controlling a transmission timing in accordance with the information on the delay time and transmitting a frame to the communication partner.

According to the invention set forth in claim 13 of this application, there is provided a computer-readable program which causes a communication apparatus to execute a process of transmitting a frame in a computer, the compute-readable program causes the computer to function as a data processor which processes a transmission/reception frame, and a communication unit which transmits/receives the frame, wherein the data processor estimates a delay time of a communication partner in accordance with a required period of time from when a reference frame serving as a reference of delay time estimation is transmitted to the communication partner to when a response frame supplied from the communication partner is received.

According to the invention set forth in claim 14 of this application, there is provided a computer-readable program which causes a communication apparatus to execute a process of transmitting a frame in a computer, the compute-readable program causes the computer to function as a data processor which processes a transmission/reception frame, and a communication unit which transmits/receives the frame, wherein the data processor extracts information on a delay time of the data processor from a notification frame transmitted from a communication partner, and the communication unit controls a transmission timing in accordance with the information on the delay time and transmits a frame to the communication partner.

The computer program according to claims 13 and 14 in this application defines a computer readable program which realizes a predetermined process in the computer. In other words, by installing the computer programs set forth in claims 13 and 14 of this application in the computer, cooperative operation is efficiently performed and operation effects the same as those of the communication apparatuses according to claims 1 and 10 in this application may be obtained.

According to the invention set forth in claim 13 of this application, there is provided a communication system including a first communication apparatus which estimates a delay time of a communication partner in accordance with a required period of time from when a reference frame serving as a reference of delay time estimation is transmitted to the communication partner to when a response frame supplied from the communication partner is received and which transmits a notification frame including information on the delay time to the communication partner, and a plurality of second communication apparatuses which return response frames in response to reception of the reference frame and which control timings of transmission of frames to the first communication apparatus in accordance with the information on delay times included in the notification frame.

Note that the term "system" herein means logical aggregate of a plurality of apparatuses (or function modules which realize specific functions), and the apparatuses or the function module may be or may not be incorporated in a single cabinet.

Advantageous Effects of Invention

According to the present invention, an excellent communication apparatus, an excellent communication method, an excellent computer program, and an excellent communication system which are capable of performing appropriate communication operation by employing the space division multiple access in which wireless resources on a space axis are shared by a plurality of users, may be provided.

Furthermore, according to the present invention, an excellent communication apparatus, an excellent communication method, an excellent computer program, and an excellent communication system which are capable of performing appropriate communication operation by employing the space division multiple access under an environment of communication operated on the basis of the CSMA may be provided.

Furthermore, according to the present invention, an excellent communication apparatus which operates while being associated with an access point, which address interference among users of different terminals, and which appropriately transmits an uplink frame to the access point, an excellent communication method, an excellent computer program, and an excellent communication system may be provided.

According to the present invention set forth in claims 1, 6, 11, 13, and 15, the access point may estimate delay times of terminals through frame exchange performed between the access point and the terminals, for example.

According to the present invention set forth in claims 7, 9, 11, and 15, the access point may notify the terminals of information on the delay times of the terminals estimated through the frame exchange with the terminal.

According to the present invention set forth in claims 10, 12, 14, and 15, since the terminals perform uplink frame transmission to the access point taking a difference among the delay times into consideration, interference among users in the access point may be reduced and throughput of the system which performs the space division multiple access is improved. Furthermore, according to the present invention set forth in claims 10, 12, and 14, the communication apparatus may function as a terminal which operates while being associated with the access point, address interference to a user of another terminal, and appropriately transmit an uplink frame to the access point.

Further objects, features, and advantages of the present invention will become apparent in the detailed description based on an embodiment of the present invention described below and the accompanying drawings.

BRIEF DESCRIPTION OF DRAWINGS

FIG. 3 is a diagram illustrating a configuration of a communication apparatus which does not employ the space division multiple access and which conforms to a conventional standard such as the IEEE802.11a.

FIG. 10 is a flowchart illustrating another processing procedure for estimating a delay time of a communication partner and performing notification of the delay time.

DESCRIPTION OF EMBODIMENTS

An embodiment of the present invention will be described in detail hereinafter with reference to the accompanying drawings.

Figure 1:
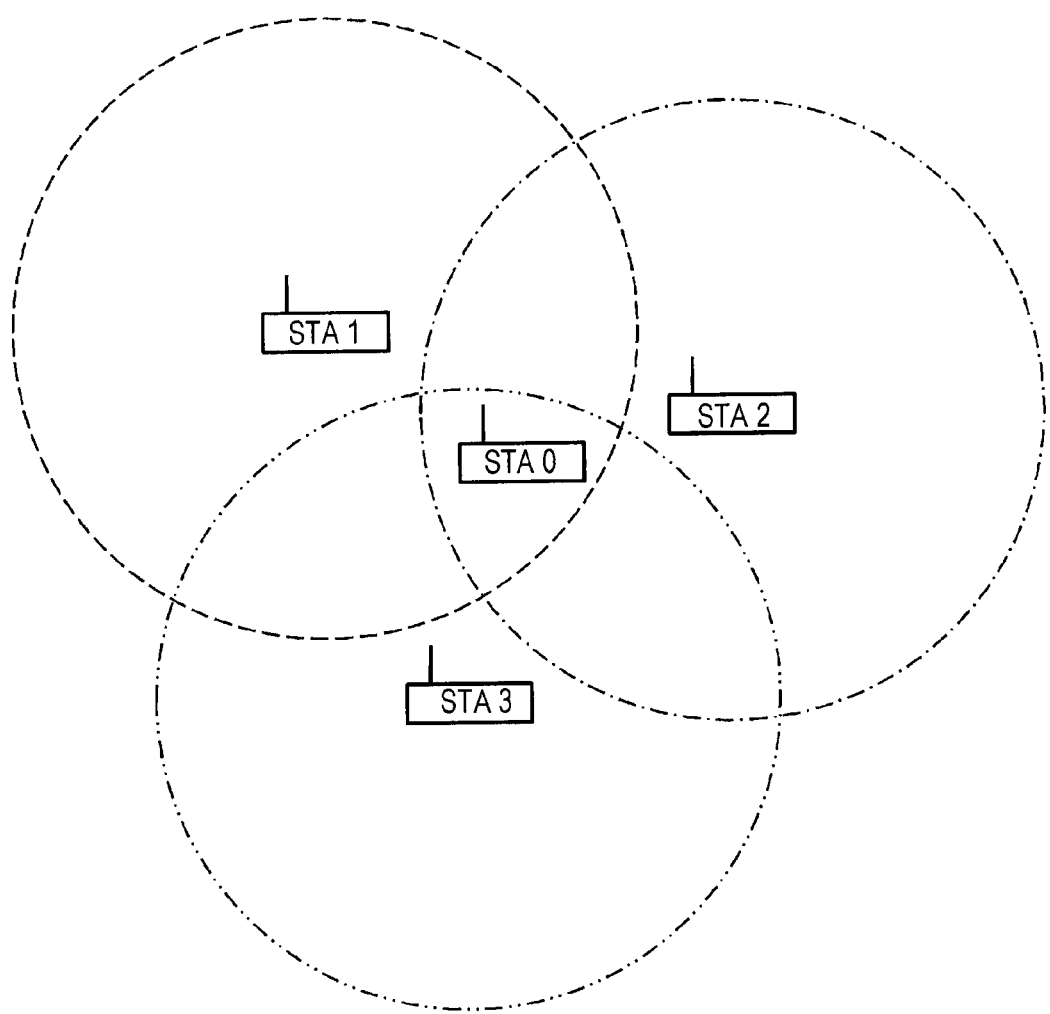
FIG. 1 is a diagram schematically illustrating a configuration of a communication system according to an embodiment of the present invention.

FIG. 1 schematically shows a configuration of a communication system according to an embodiment of the present invention. The communication system of this embodiment conforms to the IEEE802.11 standard and employs a CSMA/CA control procedure and RTS/CTS handshake (described above) in combination.

The communication system in the drawing includes a communication station STA0 functioning as an access point (AP) and a plurality of communication stations STA1, STA2, and STA3 functioning as terminals (client devices) (MTs). Each of the communication stations STA1, STA2, and STA3 includes the communication station STA0 within a communication range thereof and may directly communicate with the communication station STA0 that is, the communication stations STA1, STA2, and STA3 are disposed under control of the communication station STA0 serving as the access point and constitute a BSS (Basic Service Set)). Note that it is necessarily the case that each of the communication stations STA1, STA2, and STA3 is included in the other communication ranges, and direct communication among the terminals will not be mentioned hereinafter.

Here, the communication station STA0 is a communication apparatus which includes a plurality of antennas and which performs space division multiple access using an adaptive array antenna, and attains multiplex frame communication by assigning wireless resources on a space axis to a plurality of users. Specifically, the communication station STA0 is a communication apparatus which conforms to a new standard such as the IEEE802.11ac standard and performs one-to-many frame communication by multiplexing two or more frames corresponding to different destination communication stations on the same time axis and by dividing frames which have been multiplexed and transmitted to the communication station STA0 by two or more communication stations on the same time axis on the basis of transmission sources. Since the communication station STA0 has a large number of antennas, the number of terminals to be subjected to spatial multiplexing is increased. Needless to say, the communication station STA0 may perform not only the one-to-many frame communication with the communication stations STA1, STA2, and STA3 using the space division multiple access but also one-to-one frame communication with each of the communication stations STA1, STA2, and STA3.

On the other hand, each of the communication stations STA1, STA2, and STA3 serving as the terminal is a communication apparatus which has a plurality of antennas and which performs the space division multiple access using an adaptive array antenna. Each of the communication stations STA1, STA2, and STA3 performs user division only at a time of reception but does not perform the user division at a time of transmission, that is, does not perform multiplexing of transmission frames, and therefore, the number of antennas may be smaller than that of the access point. Note that at least one of the terminals may conform to the conventional standard such as the IEEE802.11a standard. In other words, the communication system shown in FIG. 1 is a communication environment in which communication equipment confirming to the new standard and communication equipment conforming to the conventional standard are mixed.

Figure 2:
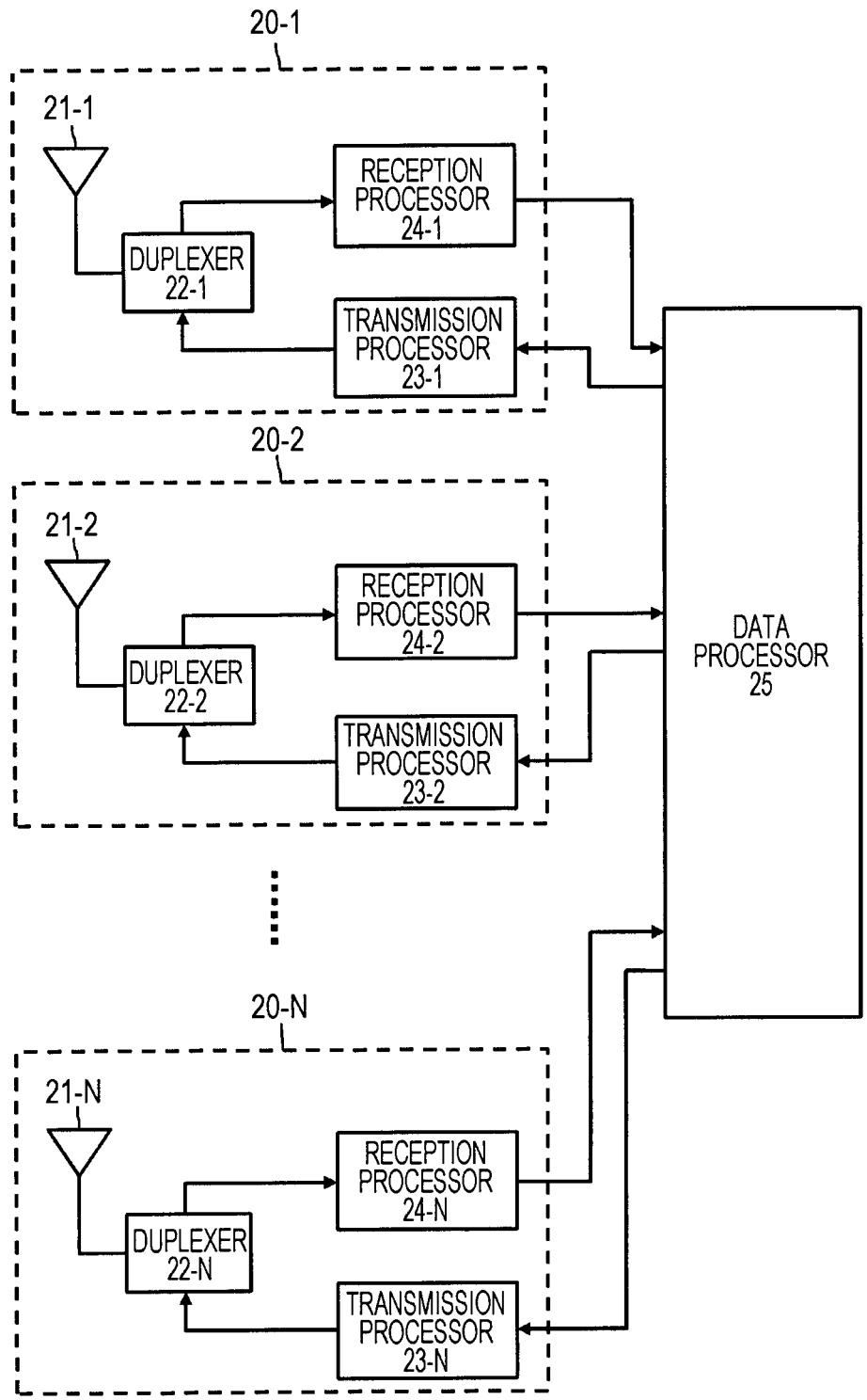
FIG. 2 is a diagram illustrating a configuration of a communication apparatus which employs space division multiple access and which is capable of performing multiplexing of a plurality of users.

FIG. 2 shows a configuration of a communication apparatus which employs the SDMA and which is capable of performing multiplexing of a plurality of users. In the communication system shown in FIG. 1, some of the communication station STA0 functioning as the access point and the communication stations STA1, STA2, and STA3 functioning as the terminals which employ the SDMA have the configuration shown in FIG. 2 and perform communication operations in accordance with the new standard.

The communication apparatus shown in the drawing includes N transmission/reception branches 20-1 to 20-N having antenna elements 21-1 to 21-N, respectively, and a data processor 25 which is connected to the transmission/reception branches 20-1 to 20-N and which processes transmission/reception data (note that N is an integer number larger than 2). The antenna elements 21-1 to 21-N function as an adaptive array antenna when appropriate weight for an adaptive array antenna is applied. The communication station STA0 serving as the access point performs the space division multiple access using the adaptive array antenna. Since the communication station STA0 has a number of antenna elements, the number of terminals to be associated with the communication station STA0 by the multiple access may be increased.

In the transmission/reception branches 20-1 to 20-N, the antenna elements 21-1 to 21-N are connected to transmission processors 23-1 to 23-N and reception processors 24-1 to 24-N through duplexers 22-1 to 22-N, respectively.

When generating transmission data in accordance with a transmission request supplied from a higher-layer application, the data processor 25 assigns the transmission data to the transmission/reception branches 20-1 to 20-N. Furthermore, in a case where the communication apparatus corresponds to the communication station STA0 functioning as the access point, when generating transmission data to be supplied to the users, that is, to the communication stations STA1, STA2, and STA3 in accordance with the transmission request supplied from the higher-layer application, the data processor 25 performs space division by multiplying the transmission data by the transmission weight of the adaptive array antenna for individual the transmission/reception branches and assigns the transmission data to the transmission/reception branches 20-1 to 20-N. Note that the term "space division" at a time of the transmission herein only means user division in which space division is performed for individual users who simultaneously transmit frames.

Each of the transmission processors 23-1 to 23-N performs predetermined signal processes including encoding and modulation on a digital baseband transmission signal supplied from the data processor 25 before performing D/A conversion, and up-converts the signal into an RF (Radio Frequency) signal so that electric power is amplified. Then, the transmission RF signal is supplied to the antenna elements 21-1 to 21-N through the duplexers 22-1 to 22-N, and thereafter, sent to the air.

On the other hand, when an RF reception signal is supplied from the antenna elements 21-1 to 21-N to the reception processors 24-1 to 24-N through the duplexers 22-1 to 22-N, the reception processors 24-1 to 24-N down-converts the RF reception signal into an analog baseband signal before performing D/A conversion, and performs predetermined signal processes including predetermined decoding and predetermined demodulation.

The data processor 25 performs space division by multiplying digital reception signals supplied from the reception processors 24-1 to 24-N by reception weight of the adaptive array antenna so as to restore transmission data supplied from the users, that is, supplied from the communication stations STAT, STA2, and STA3 and supplies the transmission data to the higher-layer application. Note that the term "space division" at the time of the reception includes two meanings, i.e., user division in which space division is performed for individual users who simultaneously transmit frames and channel division in which an MIMO channel which has been subjected to spatial multiplexing is divided into original streams.

Here, the data processor 25 controls the transmission processors 23-1 to 23-N and the reception processors 24-1 to 24-N so that the transmission data assigned to the transmission/reception branches 20-1 to 20-N is multiplied by the transmission weight of the adaptive array antenna and the reception data supplied from the transmission/reception branches 20-1 to 20-N is multiplied by the reception weight of the adaptive array antennas whereby the antenna elements 21-1 to 21-N function as the adaptive array antenna. Furthermore, the data processor 25 learns the weight of the adaptive array antenna before performing the space division multiple access to the communication stations STA1, STA2, and STA3. For example, the weight of the adaptive array antenna may be learned by applying a certain adaptable algorithm such as RLS (Recursive Least Square) on a training signal (which will be described hereinafter) which is constituted by a known sequence and which is received from the communication stations STA1, STA2, and STA3 which are communication partners.

The data processor 25 executes processes in layers of a communication protocol in a media access control (MAC) method implemented in the communication system shown in FIG. 1, for example. Furthermore, each of the transmission/reception branches 20-1 to 20-N executes a process corresponding to a PHY layer, for example.

Note that, although the communication stations STA1, STA2, and STA3 serving as the terminals include the plurality of antennas and perform the SDMA using adaptive array antennas, the communication stations STA1, STA2, and STA3 perform the user division at a time of reception but do not perform the user division at a time of transmission, that is, does not perform multiplexing of transmission frames, and therefore, a larger number of antennas are not required when compared with a number of antennas of the access point.

Figure 3:
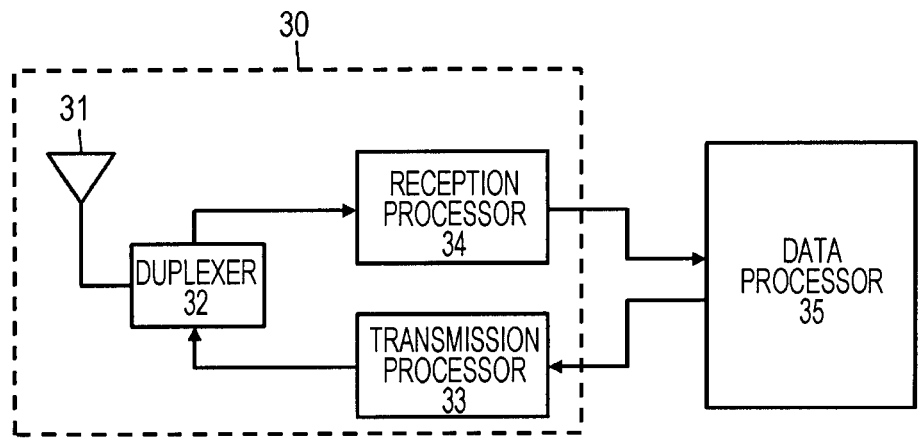

Furthermore, FIG. 3 shows a configuration of a communication apparatus which does not employ the space division multiple access and which conforms to the conventional standard such as the IEEE802.11a standard. The communication system shown in FIG. 1 includes a communication apparatus which has the configuration shown in FIG. 3 and which performs a communication operation only in accordance with the conventional standard as at least one of the communication stations STA1, STA2, and STA3 functioning as the terminals.

The communication apparatus shown in the drawing includes a transmission/reception branch 30 including an antenna element 31 and a data processor 35 which is connected to the transmission/reception branch 30 and which processes transmission/reception data. Furthermore, in the transmission/reception branch 30, the antenna element 31 is connected to a transmission processor 33 and a reception processor 34 through a duplexer 32.

The data processor 35 generates transmission data in accordance with a transmission request supplied from a higher-layer application, and outputs the transmission data to the transmission/reception branch 30. The transmission processor 33 performs predetermined signal processes including encoding and modulation on a digital baseband transmission signal before performing D/A conversion, and up-converts the signal into an RF signal so that electric power is amplified. Then, the transmission RF signal is supplied to the antenna element 31 through the duplexer 32, and thereafter, sent to the air.

On the other hand, when an RF reception signal is supplied from the antenna element 31 to the reception processor 34 through the duplexer 32, the reception processor 34 down-converts the RF reception signal into an analog baseband signal before performing D/A conversion, and performs predetermined signal processes including predetermined decoding and predetermined demodulation. The data processor 35 restores the original transmission data from a digital reception signal supplied from the reception processor 34 and supplies the transmission data to the higher-layer application.

In the communication system shown in FIG. 1, the communication station STA0 functioning as the access point multiplies the antenna elements 21-1 to 21-N by the weight of the adaptive array antenna so that the antenna elements 21-1 to 21-N function as the adaptive array antenna and directionality to the communication stations STA1, STA2, and STA3 may be formed. As a result, the wireless resources on the space axis are divided for individual users, a plurality of frames to be transmitted to the communication stations STA1, STA2, and STA3 are multiplexed and simultaneously transmitted. Furthermore, since the communication station STA0 functions as the adaptive array antenna, the communication station STA0 may performs a reception process by dividing the frames which have been simultaneously transmitted from the communication stations STA1, STA2, and STA3 for individual users on the space axis.

However, in the communication system shown in FIG. 1, when the terminals simultaneously perform uplink (UL) access to the access point so as to simultaneously transmit frames to the access point, interference occurs among the users due to delay time difference among the terminals.

Therefore, an effect of improvement of throughput by the space division multiple access is not expected.

Figure 4:
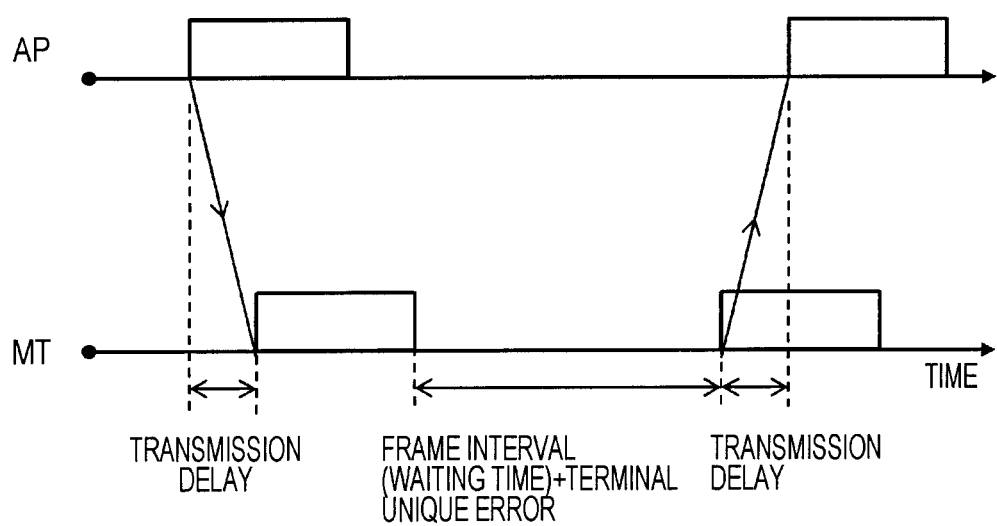
FIG. 4 is a diagram illustrating a delay time generated when wireless communication is performed.

Here, FIG. 4 shows a state in which a delay time is generated when wireless communication is performed between the access point and one of the terminals. The delay time difference is caused by transmission delay due to the relative position between the access point and the terminal and an error unique to the terminal such as clock accuracy.

The transmission delay is mainly generated by a physical distance between two communication apparatuses. A transmission direction may be changed due to not only a line distance but also reflection or scattering of electric waves.

Furthermore, the error unique to the terminal is mainly generated due to accuracy of a master clock included in the terminal. For example, if counts of a fixed frame interval performed by clocks are shifted from one another when a frame is to be transmitted after the fixed frame interval after a certain frame is received, all the terminals may not have the same frame interval.

In the specification of the IEEE802.11 standard, an error of ±90 nanoseconds is allowed as accuracy of a frame interval at a time of transmission/reception.

Therefore, in the communication system of this embodiment, frame exchange between the access point and the terminals, estimation of delay times by the access point, and transmission of notification of the delay times from the access point to the terminals are performed. Therefore, the terminals perform timing control of uplink frame transmission to the access point taking delay time differences among the terminals into consideration, and accordingly, the interference among the users in the access point may be reduced.

Figure 5:
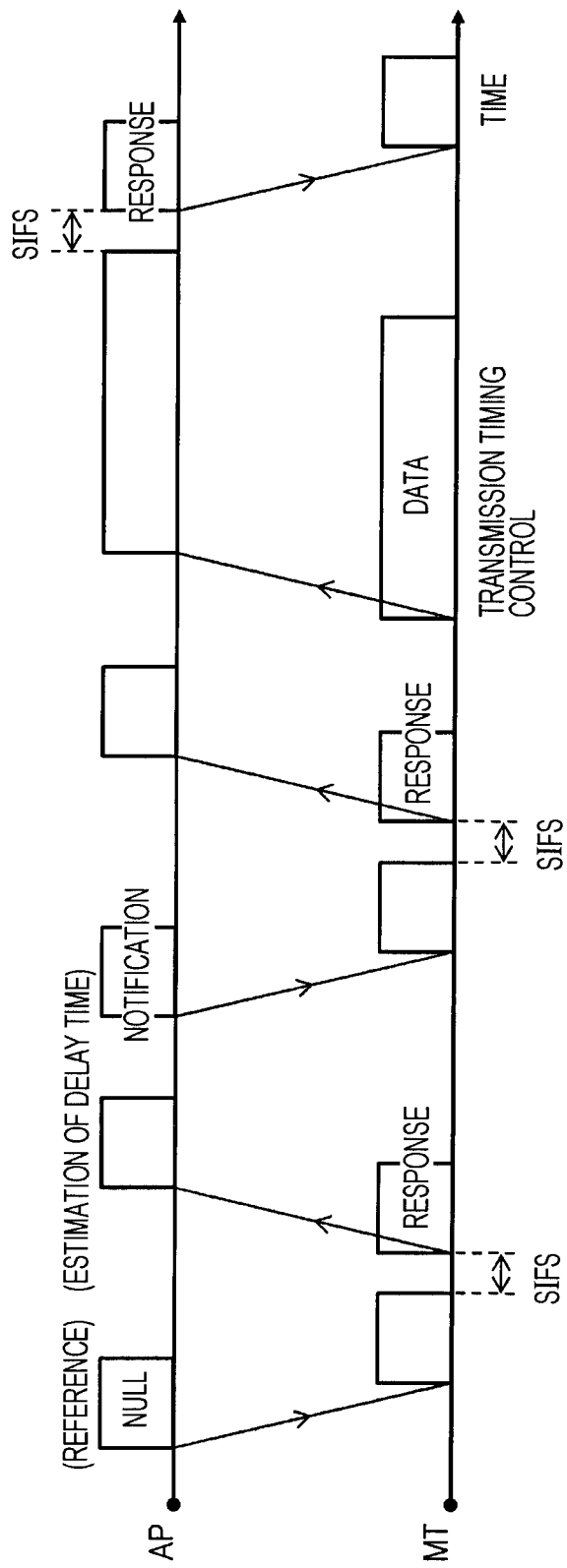
FIG. 5 is a diagram illustrating a communication sequence of performing delay time estimation, delay time notification, and transmission timing control between an access point and a terminal.

FIG. 5 shows an example of a communication sequence of performing the delay time estimation, the delay time notification, and the transmission timing control between the access point (AP) and one of the terminals (MTs).

First, the access point transmits a frame serving as a reference for the delay time estimation to one of the terminals which is a target of the estimation. In the example shown in the drawing, a null frame is used as a reference frame. The null frame is defined by the IEEE802.11 standard, and a communication station which received the null frame should return a signal ACK. Note that the gist of the present invention is not limited to the case where the null frame is used.

When the fixed frame interval has been elapsed after receiving the reference frame, the terminal transmits a response frame to the access point. The frame interval is preferably recognized by the access point and the terminal in advance. Furthermore, the frame interval is preferably as short as possible. For example, a frame interval defined by SIFS (Short Inter Frame Space) in the IEEE802.11 standard is effectively used.

When receiving the response frame from the terminal, the access point estimates a delay time of the terminal in accordance with a required period of time from when the access point transmits the reference frame to when the access point receives the reception frame. Here, high-accuracy estimation may be attained when the frame interval SIFS described above is used. In the example shown in the drawing, a value obtained by subtracting a frame length of the null frame and the frame interval from a frame round-trip transmission time corresponds to the delay time.

Next, the access point transmits a frame used to notify the terminal of information on the estimated delay time to the terminal. Information other than the information on the estimated delay time may be transmitted along with the notification frame. Then, when receiving the notification frame, the terminal returns a response frame.

Thereafter, the terminal controls a transmission timing of itself in accordance with the information on the delay time supplied from the access point and transmits a data frame to the access point. Then, when receiving the data frame, the access point returns a response frame to the terminal.

Figure 6:
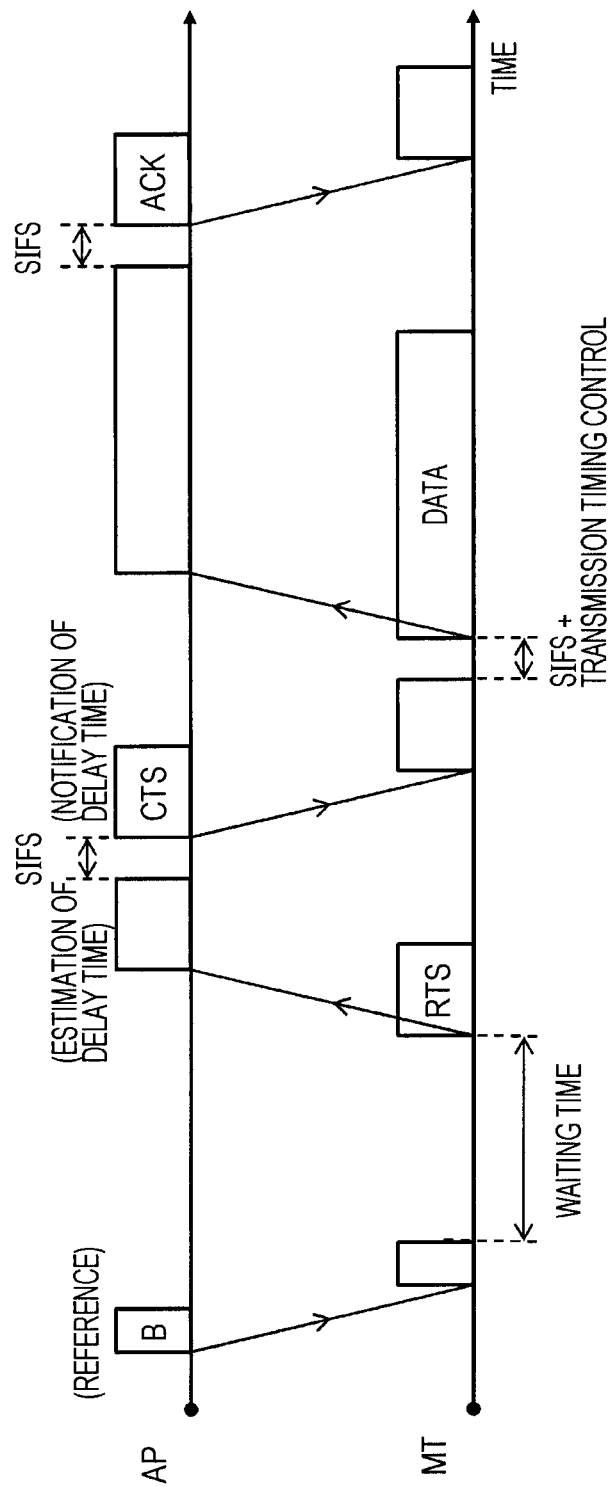
FIG. 6 is a diagram illustrating another communication sequence of performing delay time estimation, delay time notification, and transmission timing control between an access point and a terminal.

FIG. 6 shows another example of a communication sequence of performing the delay time estimation, the delay time notification, and the transmission timing control between the access point (AP) and one of the terminals (MTs). In the example of the communication sequence shown in the drawing, a delay time is estimated in accordance with a beacon frame (B) which is transmitted from the access point and which serves as a reference and notification of delay time information is transmitted to the terminal using the RTS/CTS handshake performed afterward.

First, the access point transmits a frame serving as a reference for the delay time estimation to one of the terminals serving as a target of the estimation. In the example shown in the drawing, although the beacon frame (B) is used as the reference frame, the gist of the present invention is not limited to the case where the beacon frame is used.

When an arbitrary waiting time has been elapsed after receiving the beacon frame, the terminal transmits a response frame to the access point. In the example in the drawing, the response frame corresponds to a transmission start request (RTS: Request To Send) which is used to require start of transmission of a data frame which is issued by the terminal to the access point. It is preferable that the terminal notifies the access point of the waiting time by writing information on the waiting time elapsed after receiving the beacon frame in the RTS frame. Furthermore, it is preferable that the frame interval is as small as possible.

When receiving the RTS frame from the terminal, the access point estimates a delay time of the terminal in accordance with a required period of time from when the access point transmits the beacon frame serving as the reference frame to when the access point receives the RTS frame. Here, high-accuracy estimation may be attained using the waiting time which is notified through the RTS frame. In the example shown in the drawing, a value obtained by subtracting a frame length of the beacon frame and the waiting time from a frame round-trip transmission time corresponds to the delay time.

Next, when a predetermined frame interval SIFS has been elapsed after receiving the RTS frame, the access point returns a transmission confirmation (CTS: Clear To Send) frame for notification of confirmation of the start of the transmission of the data frame. Here, the access point causes the CTS frame to include the information on the estimated delay time and notifies the terminal of the CTS frame serving as a notification frame.

When receiving the CTS frame, the terminal may recognize the fact that the access point has performed the transmission confirmation and recognize the delay time. Then, the terminal controls a transmission timing of itself in accordance with the information on the delay time supplied from the access point and transmits a data frame to the access point. The access point expects transmission of the data frame to be started when a predetermined frame interval SIFS has been elapsed after the terminal completes the reception of the CTS frame. Therefore, the terminal should control the transmission timing so that the data frame is supplied to the access point when the access point is in a reception waiting state taking the delay time into consideration.

The access point returns an ACK frame when a predetermined frame interval SIFS has been elapsed after completing the reception of the data frame from the terminal.

Figure 7:
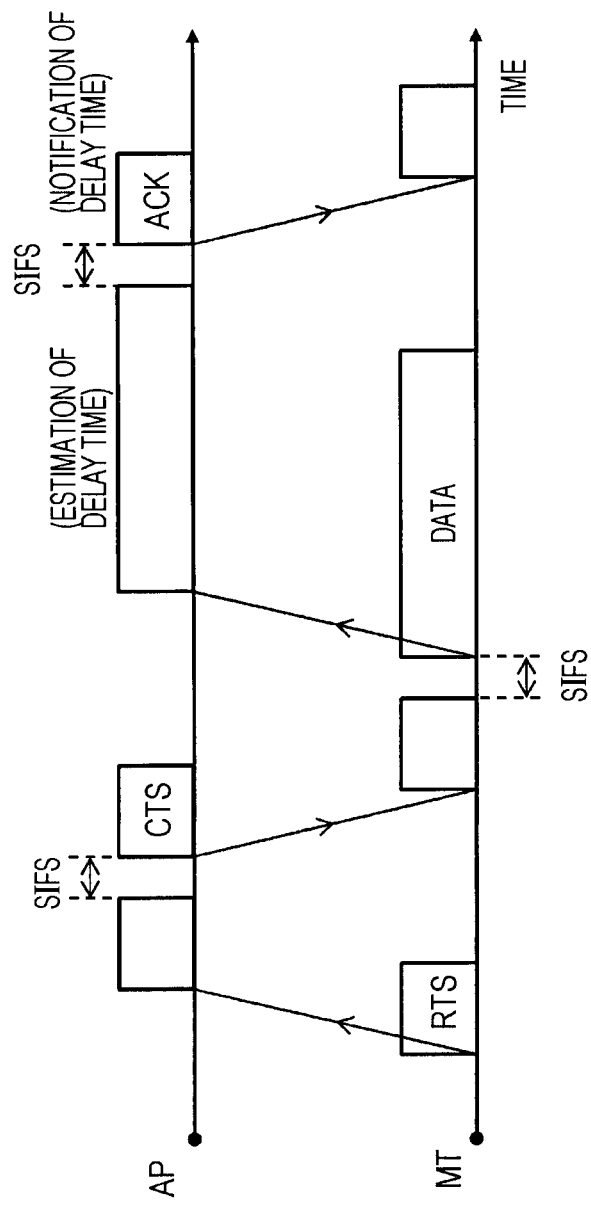
FIG. 7 is a diagram illustrating a further communication sequence of performing delay time estimation, delay time notification, and transmission timing control between an access point and a terminal.

FIG. 7 shows a further example of a communication sequence of performing the delay time estimation, the delay time notification, and the transmission timing control between the access point (AP) and one of the terminals (MTs). In an example of the communication sequence in the drawing, the estimation of a delay time is performed using a CTS frame as a reference frame which is returned from the access point in the RTS/CTS handshake started by the terminal, and in addition, notification of information on the delay time is transmitted to the terminal using the RTS/CTS handshake.

The terminal performs physical career sense in advance so as to determined whether a media is clear before performing back-off, and thereafter, transmits an RTS frame to the access point.

The access point returns a CTS frame serving as a reference of the delay time estimation when a predetermined frame interval SIFS has been elapsed after completing the reception of the RTS frame from the terminal. In the example shown in the drawing, although the CTS frame is used as the reference frame, the gist of the present invention is not limited to the case where the CTS frame is used.

When the predetermined frame interval SIFS has been elapsed after completing the reception of the CTS frame, the terminal transmits a data frame to the access point.

When receiving the data frame from the terminal, the access point estimates a delay time of the terminal in accordance with a required period of time from when the access point transmits the CTS frame serving as the reference frame to when the access point receives the data frame. Here, high-accuracy estimation may be performed when the frame interval SIFS described above is used. In the example shown in the drawing, a value obtained by subtracting a frame length of the CTS frame and the frame interval SIFS from a frame round-trip transmission time corresponds to the delay time.

Next, when the predetermined frame interval SIFS has been elapsed after completing the reception of the data frame, the access point returns an acknowledge (ACK) frame for notification of reception of the data frame. Here, the access point causes the ACK frame to include the information on the estimated delay time and notifies the terminal of the ACK frame as a notification frame.

According to the examples of the communication sequences shown in FIGS. 5 to 7, it is recognized that, in the present invention, the estimation of a delay time, the notification of a delay time, and the control of a transmission timing may be efficiently performed using an arbitrary frame.

Note that the access point should accurately recognize a frame interval or a waiting time required for sending back a response frame from a target terminal to a reference frame irrespective of a frame used as a reference frame.

Figure 8:
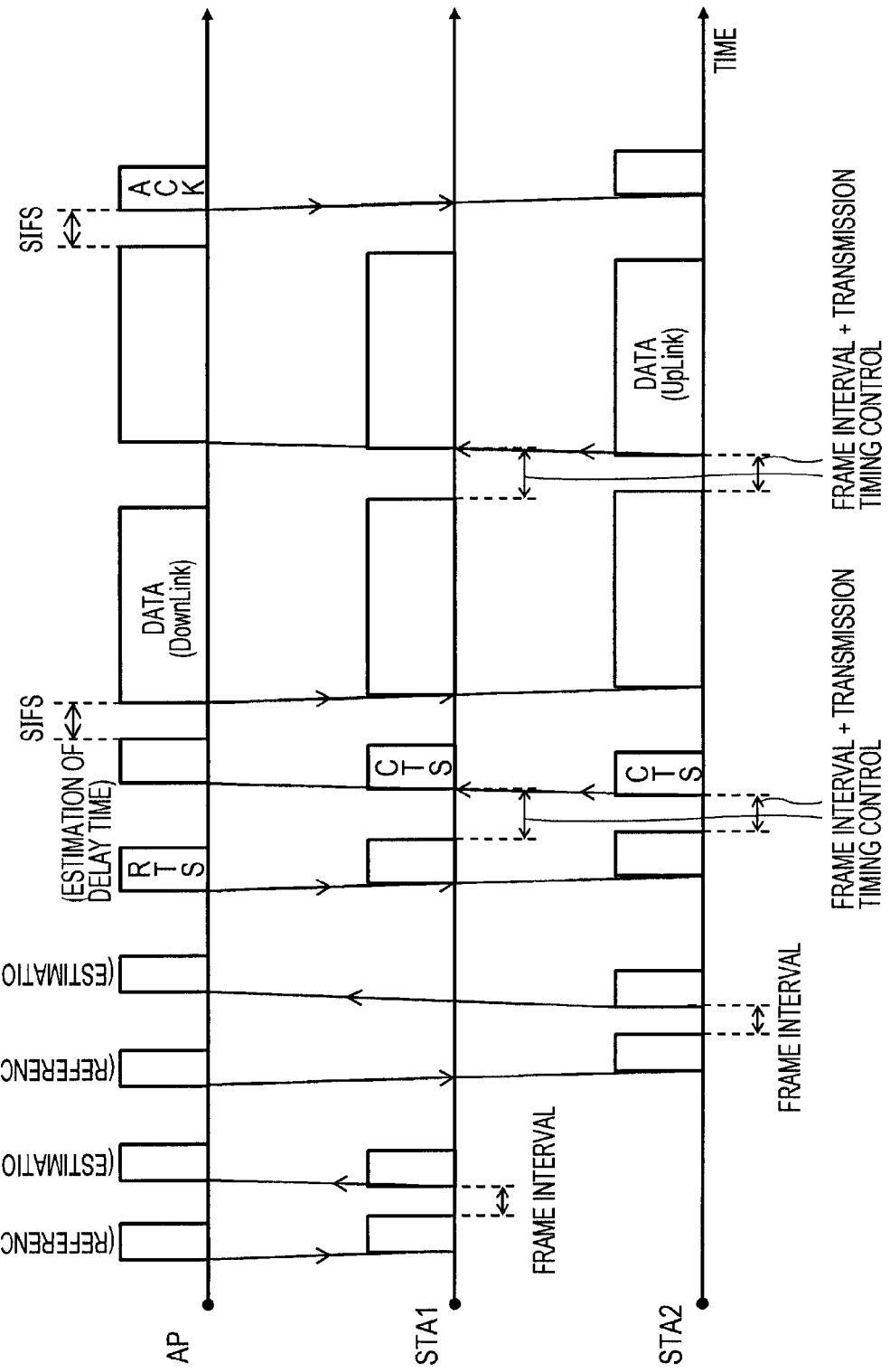
FIG. 8 is a diagram illustrating a communication sequence of performing delay time estimation, delay time notification, and transmission timing control in a communication system including an access point (AP) and a plurality of terminals (STA1 and STA2).

FIG. 8 shows an example of a communication sequence of performing delay time estimation, delay time notification, and transmission timing control in a communication system including an access point (AP) and a plurality of terminals (STA1 and STA2).

The access point may perform a process of estimating a delay time on each of the terminals or may simultaneously perform processes of estimating delay times on the individual terminals. In the example shown in FIG. 8, the access point performs a sequence of transmission of a reference frame and reception of a response frame shown in FIG. 5 on each of the terminals and performs a process of estimating a delay time on each of the terminals.

The access point may perform a process of estimating a delay time on each of the terminals or may simultaneously perform processes of estimating delay times on the terminals.

In the example shown in FIG. 8, the access point performs multiplexing on the same time axis and writes information on the delay times in RTS frames to be transmitted to the terminals (the communication stations STA1 and STA2) so that simultaneous notification is performed. The RTS frames in this case serve as notification frames.

Here, it is preferable that the access point generates and transmits information on the delay times of the terminals so that frames are simultaneously supplied from the terminals to the access point when the terminals shares the same time at a time of uplink. At this time, the access point may generate and transmit the information on the delay times within a certain error range. For example, the access point may generate the information on the delay times taking a Guard interval length into consideration when using the OFDM, for example.

Thereafter, the access point multiplexes data frames supplied to the terminals (communication stations STA1 and STA2) on the same time using the RTS/CTS handshake.

The access point performs physical career sense in advance so as to confirm that a media is clear before performing back-off, and thereafter, transmits RTS frames to the terminals (communication stations STA1 and STA2).

The access point waits for reception of a CTS frame to be supplied from the terminals (communication stations STA1 and STA2) when a predetermined frame interval SIFS has been elapsed after completing the transmission of the RTS frames. On the other hand, the terminals (communication stations STA1 and STA1) control transmission timings so that CTS frames are received by the access point when the access point is in a reception waiting state taking the delay times thereof into consideration.

Since the transmission timings are controlled, the CTS frames transmitted from the terminals (communication stations STA1 and STA2) are included in a Guard interval. Accordingly, the access point may divide the multiplexed CTS frame while interference among the users is suppressed.

Then, the access point multiplexes on the same time data frames to be transmitted to the terminals which transmitted the CTS frames, and the terminals (communication stations STA1 and STA2) receive the multiplexed data frame.

Furthermore, in the example shown in the drawing, the access point gives RDG (Reverse Direction Grant), that is, the access point allows uplink frame transmission to the access point in the data frame to be supplied to the terminals (communication stations STA1 and STA2). Then, the terminals (communication stations STA1 and STA2) starts transmission of data frames of the uplink to the access point after the reception of the data frame of downlink is completed. Here, the terminals (communication stations STA1 and STA1) control transmission timings so that the data frames are received by the access point when the access point is in a reception waiting state taking the delay times thereof into consideration.

Since the transmission timings are controlled, the CTS frames transmitted from the terminals (communication stations STA1 and STA2) are included in a Guard interval. Accordingly, the access point may divide the multiplexed CTS frame while interference among the users is suppressed. Then, the access point returns an ACK frame when a predetermined frame interval SIFS has been elapsed after completing the reception of the data frames from the terminals (communication stations STA1 and STA2).

Figure 9:
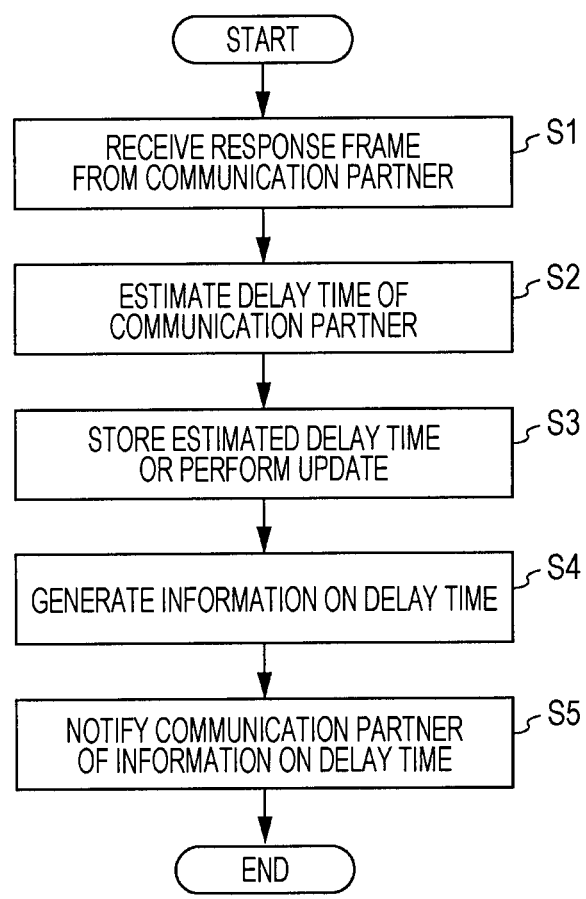
FIG. 9 is a flowchart illustrating a processing procedure for estimating a delay time of a communication partner and performing notification of the delay time.

FIG. 9 is a flowchart illustrating a processing procedure for estimating a delay time of a communication partner and transmitting notification of the delay time which is performed by the communication apparatus shown in FIG. 2 which functions as the access point in the examples of the communication sequences shown in FIGS. 5 to 8.

The communication apparatus receives a response frame from the communication partner after transmitting a reference frame (in step S1). A frame interval or a waiting time from when the communication partner completes reception of the reference frame to when the communication partner starts transmission of the response frame is recognized by the communication apparatus in advance or is transmitted from the communication partner to the communication apparatus through the response frame or the like.

Then, the communication apparatus estimates a delay time of the communication partner in accordance with a period of time from when the communication apparatus transmits the reference frame to when the communication apparatus receives the response frame (in step S2). The communication apparatus stores the estimated delay time after associating the estimated delay time with the communication partner or updates a delay time stored in advance by the delay time estimated in step S2 (in step S3).

Subsequently, the communication apparatus generates information on the delay time of the communication partner (in step S4) before transmitting the information using a frame to be supplied to the communication partner (in step S5).

According to the processing procedure shown in FIG. 9, the communication apparatus may generate the information on the delay time again to be actually transmitted to the communication partner after estimating the delay time in accordance with a frame transmission/reception interval. The information on the delay time may be represented by an absolute time of the delay time or a relative time relative to a current state, for example. The communication apparatus may generate the information on the delay time taking a system parameter into consideration. For example, the communication apparatus may determine a temporal resolution of the information to be transmitted in accordance with a signal band width of the system.

Furthermore, FIG. 10 is a flowchart illustrating another processing procedure for estimating a delay time of a communication partner and transmitting notification of the delay time which is performed by the communication apparatus shown in FIG. 2 which functions as the access point in the examples of the communication sequences shown in FIGS. 5 to 8. In the processing procedure, when generating information on a delay time, the communication apparatus controls the information to be generated under a certain condition.

The communication apparatus receives a response frame from the communication partner after transmitting a reference frame (in step S11). A frame interval or a waiting time from when the communication partner completes reception of the reference frame to when the communication partner starts transmission of the response frame is recognized by the communication apparatus in advance or is transmitted from the communication partner through the response frame or the like.

Then, the communication apparatus estimates a delay time of the communication partner in accordance with a period of time from when the communication apparatus transmits the reference frame to when the communication apparatus receives the response frame (in step S2). The communication apparatus stores the estimated delay time after associating the estimated delay time with the communication partner or updates a delay time stored in advance by the delay time estimated in step S12 (in step S13).

Subsequently, the communication apparatus determines whether the estimated delay time is larger than a predetermined threshold value (in step S14).

When the delay time estimated in step S12 is not larger than the predetermined threshold value (when the determination is negative in step S14), it is estimated that a delay time of a frame to be supplied from the communication partner is within a Guard interval and does not cause interference among the users. Therefore, the communication apparatus determines that the information on the delay time is not supplied to the communication partner (in step S15) and an entire routine of this process is terminated.

On the other hand, when the delay time estimated in step S12 is larger than the predetermined threshold value (when the determination is affirmative in step S14), it is estimated that the delay time of the frame to be supplied from the communication partner exceeds the Guard interval and causes the interference among the users. In this case, the delay time should be transmitted to the communication partner so that the communication partner controls a transmission timing. Therefore, the communication apparatus generates information on the delay time of the communication partner (in step S16) before transmitting the information using a frame to be supplied to the communication partner (in step S17).

According to the processing procedure shown in FIG. 10, when the estimated delay time is not larger than the predetermined threshold value, it is determined that the notification of the delay time is not performed. The information to be generated may be changed in accordance with a plurality of levels of the threshold value.

In any processing procedure, the communication apparatuses functioning as the access point and the terminals may store information on estimated delay times or information on notified delay times. Furthermore, the estimation of the delay time and the notification of the delay time are repeatedly performed, the stored information may be successively updated. Furthermore, the information on the delay times may be generated taking the stored information into consideration.

According to the communication system of this embodiment, since frame exchange is performed between the access point and the terminals, the access point performs estimation of a delay time, the access point notifies the terminals of delay times, and the terminals perform uplink frame transmission to the access point taking a difference between delay times into consideration, interference among users in the access point may be reduced and throughput of the system which performs the space division multiple access is improved.

Industrial Applicability

The present invention has been described in detail with reference to the specific embodiment hereinabove. However, it is apparent that corrections and modifications of the embodiment may be made by those skilled in the art without departing from the scope of the present invention.

In this specification, although the description has been made mainly about the embodiment employed in the new wireless LAN standard such as the IEEE802.11ac standard which aims for the realization of ultrahigh throughput of 1 Gbps, the scope of the present invention is not limited to this. For example, the present invention is similarly applicable to other wireless LAN systems in which wireless resources on a space axis are shared by a plurality of users and other wireless system other than the LAN systems.

A range of application of the present invention is not limited to SDMA systems but is similarly applicable to a wireless LAN in which an access point should control a transmission timing of a terminal (or an access point should control a transmission timing of a communication partner) or other communication systems.

That is, the present invention has been disclosed as an example and the content described in this specification may not be interpreted in a limited way. Claims should be referred to in order to evaluate the scope of the present invention.

REFERENCE SIGNS LIST 20-1, 20-2 transmission/reception branch
21-1, 21-2 antenna element
22-1, 22-2 duplexer
23-1, 23-2 transmission processor
24-1, 24-2 reception processor
25 data processor
30 transmission/reception branch
31 antenna element
32 duplexer
33 transmission processor
34 reception processor
35 data processor

The invention claimed is:

1. A communication apparatus comprising:
a communication unit operable to transmit a reference frame and receive a response frame in response to the transmitted reference frame; and
a data processor operable to estimate a delay time of a communication partner in accordance with a period of time from the transmission of the reference frame to the communication partner to the reception of the response frame supplied from the communication partner,
wherein the communication partner starts transmission of the response frame when a predefined frame interval has elapsed after reception of the reference frame at the communication partner, and wherein the data processor estimates the delay time of the communication partner based on the period of time and the predefined frame interval.

2. The communication apparatus according to claim 1, wherein the communication partner starts transmission of the response frame including information on an arbitrary waiting time when a waiting time has been elapsed after the reception of the reference frame is completed, and the data processor estimates the delay time of the communication partner based on the period of time and the waiting time obtained from the response frame.

3. The communication apparatus according to claim 1, wherein the communication unit comprises a plurality of antenna elements functioning as an adaptive array antenna, multiplexes and transmits a plurality of frames at the same time, and receives a plurality of frames transmitted from a plurality of communication partners at the same time.

4. The communication apparatus according to claim 3, wherein the communication unit transmits the reference frame to the plurality of communication partners, and the data processor estimates delay time of each of the plurality of communication partners in accordance with the period of time until the response frame returns from the each plurality of communication partners such that at least portions of each reference frame overlap with one another on a time axis.

5. The communication apparatus according to claim 1, wherein the data processor stores information on the estimated delay time or updates information on an estimated delay time which has been stored.

6. The communication apparatus according to claim 1, wherein the data processor determines information on the estimated delay time and generates a notification frame including the information on the delay time, and the communication unit transmits the notification frame to the communication partner.

7. The communication apparatus according to claim 6, wherein the data processor determines the information on the delay time in accordance with a result of a comparison between the estimated delay time and a predetermined threshold value.

8. The communication apparatus according to claim 6, wherein the communication unit transmits the reference frame to a plurality of communication partners, the data processor determines information on the delay time of each of the plurality of communication partners and generates a notification frame, and the communication unit transmits the notification frame to the plurality of communication partners at the same time.

9. A communication apparatus comprising:
a communication unit operable to receive a notification frame transmitted from a communication partner; and
a data processor operable to extract information on a delay time of the data processor from the notification frame,
wherein the communication unit controls a transmission timing in accordance with the information on the delay time, wherein the delay time of the data processor is estimated based on a round-trip transmission time of a reference frame between the communication partner and the communication apparatus and a frame length of the reference frame, wherein the round-trip transmission time comprises a predefined frame interval that has elapsed after receipt of the reference frame at the communication apparatus.

10. A communication method comprising:
transmitting a reference frame to a communication partner;
estimating a delay time of the communication partner in accordance with a period of time until a response frame transmitted from the communication partner in response to the transmitted reference frame is received, wherein the communication partner starts transmission of the response frame when a predefined frame interval has elapsed after reception of the reference frame at the communication partner, and wherein the delay time of the communication partner is estimated based on the period of time and the predefined frame interval;
determining information on the estimated delay time and generating a notification frame including the information on the estimated delay time; and
transmitting the notification frame to the communication partner.

11. A communication method comprising:
in a communication apparatus:
receiving a notification frame transmitted from a communication partner;
extracting information on a delay time of the communication apparatus from the notification frame; and
controlling a transmission timing in accordance with the information on the delay time, wherein the delay time is estimated based on a round-trip transmission time of a reference frame between the communication partner and the communication apparatus and a frame length of the reference frame, wherein the round-trip transmission time comprises a predefined frame interval that has elapsed after receipt of the reference frame at the communication apparatus.

12. A non-transitory computer readable storage medium having stored thereon, a computer program having at least one code section executable by a computer for causing the computer to perform the steps comprising:

transmitting a reference frame and receiving a response frame in response to the transmitted reference frame;

estimating a delay time of a communication partner in accordance with a period of time from the transmission of the reference frame to the communication partner to the reception of the response frame supplied from the communication partner, wherein the communication partner starts transmission of the response frame when a predefined frame interval has elapsed after reception of the reference frame at the communication partner, and wherein the delay time of the communication partner is estimated based on the period of time and the predefined frame interval.

13. A non-transitory computer readable storage medium having stored thereon, a computer program having at least one code section executable by a computer for causing the computer to perform the steps comprising:

in a communication apparatus:

receiving a notification frame transmitted from a communication partner;

extracting information on a delay time of a data processor of the communication apparatus from the notification frame; and controlling a transmission timing in accordance with the information on the delay time, wherein the delay time of the data processor is estimated based on a round-trip transmission time of a reference frame between the communication partner and the communication apparatus and a frame length of the reference frame, wherein the round-trip transmission time comprises a predefined frame interval that has elapsed after receipt of the reference frame at the communication apparatus.

14. A communication system comprising:

a first communication apparatus operable to:

estimate a delay time of a communication partner in accordance with a period of time from when a reference frame is transmitted to the communication partner to when a response frame supplied from the communication partner is received, wherein the communication partner starts transmission of the response frame when a predefined frame interval has elapsed after reception of the reference frame at the communication partner, and wherein the first communication apparatus estimates the delay time of the communication partner based on the period of time and the predefined frame interval; and transmit a notification frame including information on the delay time to the communication partner; and a plurality of second communication apparatuses each operable to:

return the response frame in response to reception of the reference frame; and control timing transmission of frames to the first communication apparatus in accordance with the information on the delay time included in the notification frame.

15. The communication apparatus according to claim 1, wherein the delay time is calculated by subtracting a frame length of the reference frame and the predefined frame interval after which the communication partner sends the response frame from a round-trip transmission time of the reference frame between the communication apparatus and the communication partner.

16. The communication apparatus according to claim 1, wherein the data processor divides a plurality of multiplexed frames received from a plurality of communication partners on a space axis.

17. The communication apparatus according to claim 1, wherein the communication partner starts uplink frame transmission to the communication apparatus after reception of downlink data frames is completed, and when the communication apparatus allows the uplink frame transmission to the communication apparatus.

* * * * *